United States Patent
Zhang et al.

(10) Patent No.: US 8,208,696 B2
(45) Date of Patent: Jun. 26, 2012

(54) RELATION TREE

(75) Inventors: Tong Zhang, San Jose, CA (US); Hui Chao, San Jose, CA (US); Christopher Willis, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 12/637,977

(22) Filed: Dec. 15, 2009

(65) Prior Publication Data

US 2011/0142300 A1    Jun. 16, 2011

(51) Int. Cl.
*G06K 9/00* (2006.01)
*G05B 19/00* (2006.01)
*G06F 21/00* (2006.01)

(52) U.S. Cl. ...... 382/118; 382/115; 340/5.53; 340/5.83; 713/186

(58) Field of Classification Search .......... 382/115–118, 382/162, 164, 173, 190, 195, 181, 199, 203, 382/224, 225, 284, 272, 276; 340/5.1, 5.2, 340/5.52, 5.53, 5.8, 5, 86, 5.83; 713/186
See application file for complete search history.

(56) References Cited

U.S. PATENT DOCUMENTS

| | | | |
|---|---|---|---|
| 7,035,456 B2 * | 4/2006 | Lestideau | 382/164 |
| 7,564,994 B1 * | 7/2009 | Steinberg et al. | 382/118 |
| 7,831,069 B2 * | 11/2010 | Shah et al. | 382/118 |
| 8,041,082 B1 * | 10/2011 | Baluja et al. | 382/118 |
| 2009/0169062 A1 * | 7/2009 | Cheung et al. | 382/115 |
| 2010/0312609 A1 * | 12/2010 | Epshtein et al. | 705/10 |

* cited by examiner

*Primary Examiner* — Sheela Chawan
(74) *Attorney, Agent, or Firm* — Chun-Liang Kuo

(57) ABSTRACT

A method for creating a relation tree including scanning a storage device for digital images and performing at least one facial analysis on individuals in the digital images, identifying members of a nuclear family and an association of an individual from the digital images with the nuclear family in response to at least one of the facial analysis, and organizing the relation tree such that the nuclear family is linked with the associated individual.

20 Claims, 9 Drawing Sheets

FACIAL ANALYSIS OF DIGITAL IMAGES

To Figure 2B

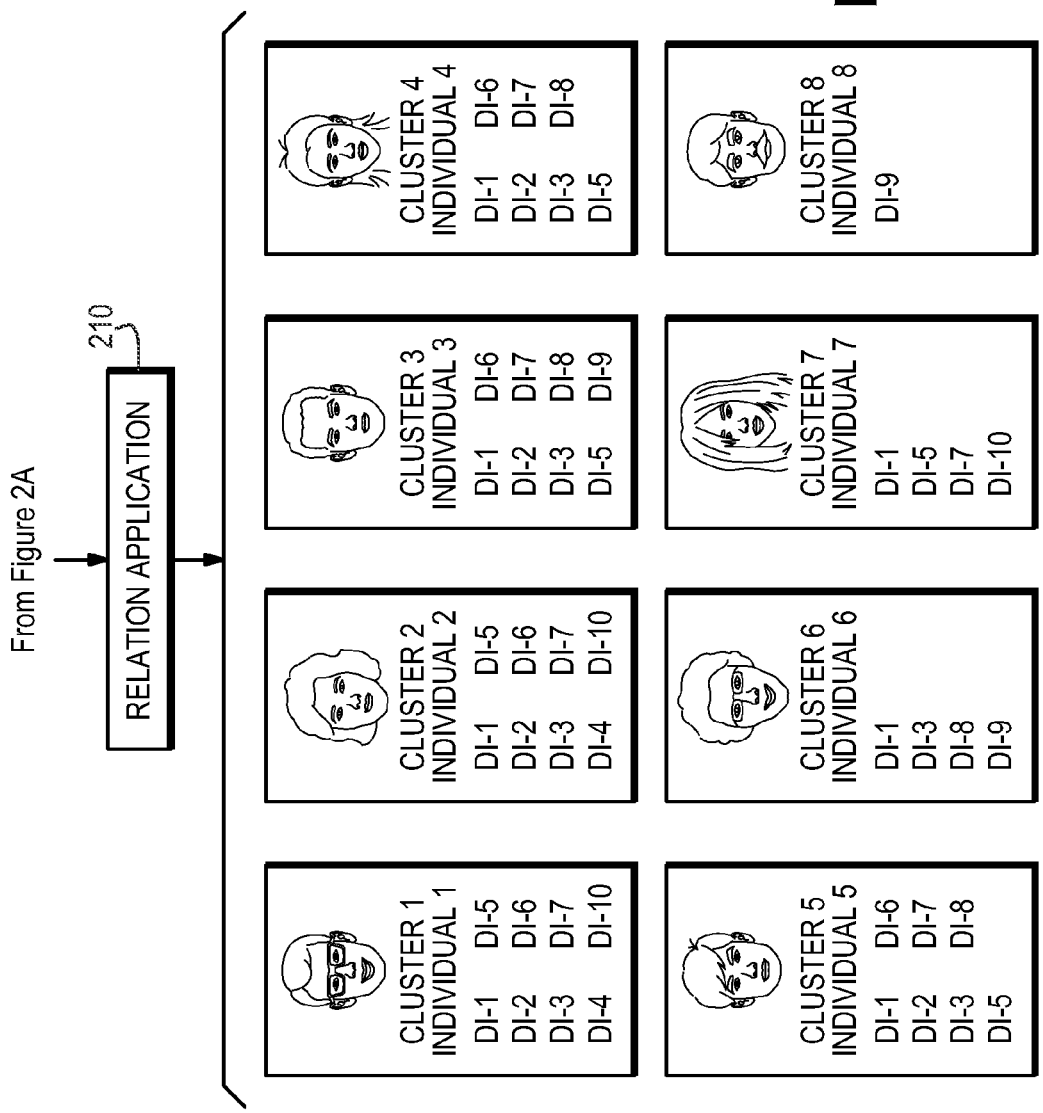

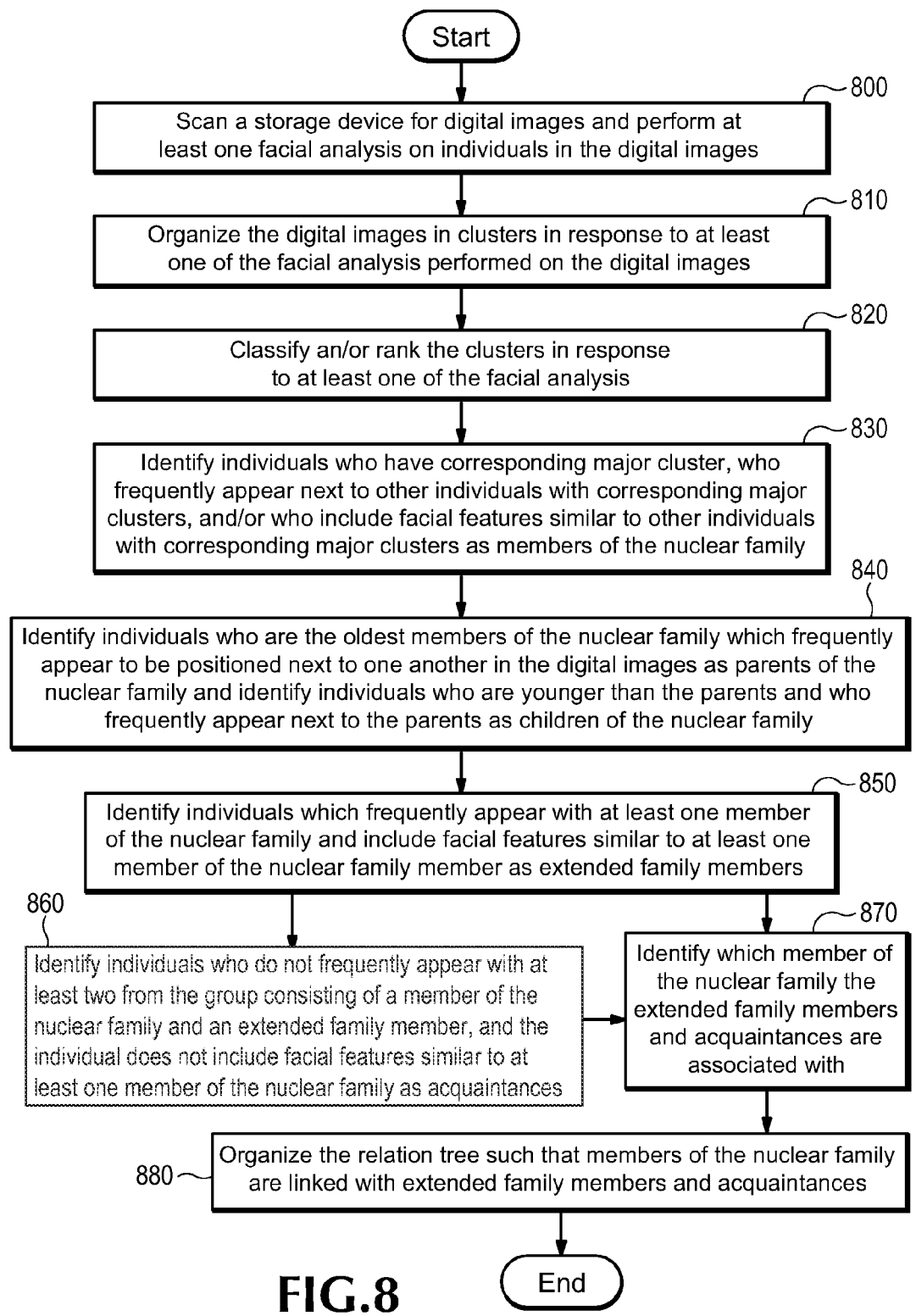

RELATION TREE

BACKGROUND

When organizing digital images, a user can couple a storage device to a computing machine and proceed to view the digital images on the storage device. While viewing the digital images, the user can proceed to label and sort one or more of the digital images. Once the digital images have been sorted, the user can view the organized or sorted images on a display device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

FIG. 2A and FIG. 2B illustrate a relation application creating clusters in response to at least one facial analysis performed on digital images according to an embodiment of the invention.

FIG. 8 is a flow chart illustrating a method for creating a relation tree according to another embodiment of the invention.

DETAILED DESCRIPTION

Figure 1:
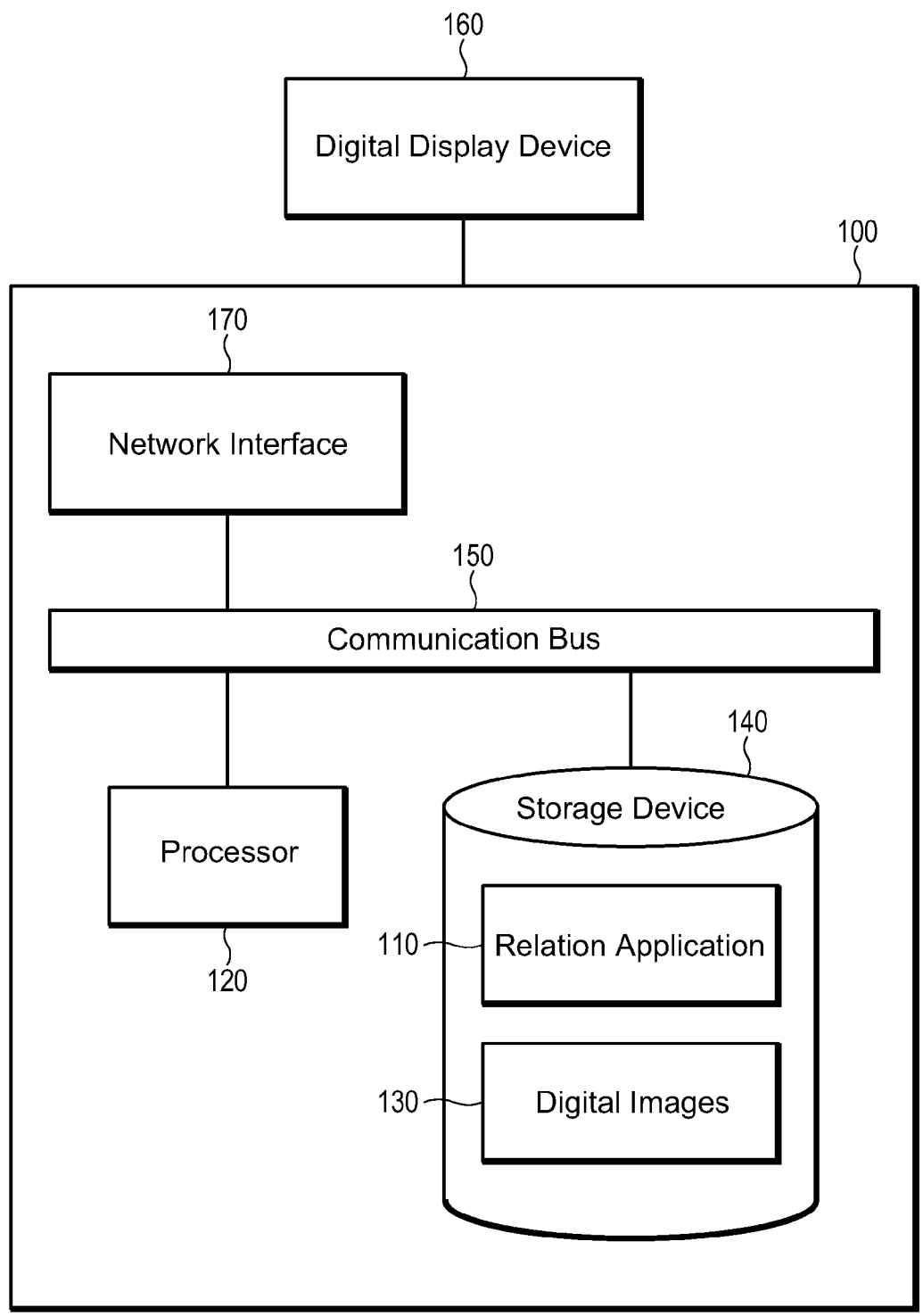
FIG. 1 illustrates a machine coupled to a storage device with digital images according to an embodiment of the invention.

FIG. 1 illustrates a machine 100 coupled to a storage device 140 with digital images 130 according to an embodiment of the invention. In one embodiment, the machine 100 is a desktop, laptop/notebook, netbook, and/or any other computing device which the storage device 140 can be coupled to. As illustrated in FIG. 1, the machine 100 includes a processor 120, a network interface 170, and a communication bus 150 for the machine 100 and/or one or more components of the machine 100 to communicate with one another.

Additionally, as illustrated in FIG. 1, the machine 100 is coupled to a digital display device 160 and a storage device 140. As shown in FIG. 1, the storage device 140 stores a relation application 110 and digital images 130. In other embodiments, the machine 100 includes additional components and/or is coupled to additional components in addition to and/or in lieu of those noted above and as illustrated in FIG. 1.

As noted above, the machine 100 includes a processor 120. The processor 120 sends data and/or instructions to one or more components of the machine 100, such as the storage device 140, the digital display device 160, and the relation application 110. Additionally, the processor 120 receives data and/or instruction from one or more components of the machine 100, such as the storage device 140 and the relation application 110.

The relation application 110 is an application which can be utilized in conjunction with the processor 120 to create and/or organize a relation tree. For the purposes of this application, a relation tree links members of a nuclear family to one another and links individuals associated with members of the nuclear family to the nuclear family.

The nuclear family includes individuals who frequently appear in the digital images 130 and who are identified by the relation application 110 to be family members. An individual from the digital images 130 is identified by the relation application 110 to be a family member when the individual has facial features similar to at least one other nuclear family member and/or when the individual frequently appears next to at least one nuclear family member in the digital images. Further, the nuclear family includes parents of the nuclear family and any children of the parents.

Additionally, individuals identified to be associated with members of the nuclear family can include at least one extended family member and/or at least one acquaintance of the nuclear family. In one embodiment, at least one of the acquaintances can include a friend, coworker, and/or neighbor. In other embodiments, at least one of the acquaintances can be additional people who are associated with a member of the nuclear family in additional ways in addition to and/or in lieu of those noted above.

When creating and/or rendering the nuclear family, the relation application 110 initially configures the processor 120 by sending one or more instructions for the processor 120 to scan the storage device 140 for digital images 130. Once the processor 120 has found at least one digital image 130, the relation application 110 will proceed to perform at least one facial analysis on individuals of the digital images 130. For the purposes of this application, individuals of the digital images 130 are people who are included and displayed in at least one of the digital images 130.

Utilizing the results of at least one of the facial analysis, the relation application 110 will proceed to identify members of the nuclear family and an association of other individuals included or displayed in the digital images 130. The relation application 110 will then proceed to create and/or render the relation tree such that members of the nuclear family are linked with one another and at least one individual associated with a member of the nuclear family is linked to the nuclear family.

The relation application 110 can be firmware which is embedded onto the machine 100. In other embodiments, the relation application 110 is a software application stored on the machine 100 within ROM or on the storage device 140 accessible by the machine 100 or the relation application 110 is stored on a computer readable medium readable and accessible by the machine 100 from a different location.

Additionally, in one embodiment, the storage device 140 is included in the machine 100. In other embodiments, the storage device 140 is not included in the machine 100, but is accessible to the machine 100 utilizing a network interface of the machine 100. The network interface can be a wired or wireless network interface card.

In a further embodiment, the relation application 110 is stored and/or accessed through a server coupled through a local area network or a wide area network. The relation application 110 communicates with devices and/or components coupled to the machine 100 physically or wirelessly through a communication bus 150 included in or attached to the machine 100. In one embodiment the communication bus 150 is a memory bus. In other embodiments, the communication bus 150 is a data bus.

As noted above, the relation application 110 can be utilized in conjunction with the processor 120 to create a relation tree. Additionally, when creating the relation tree, the relation application 110 sends instructions for the processor 120 to scan the storage device 140 for digital images 130.

The digital images 130 are digital media files of images. As illustrated in FIG. 1, in one embodiment, the digital images 130 are stored on the storage device 140. In another embodiment, the digital images 130 can be stored on an additional device and accessible to the relation application 110 when the additional device couples to the machine 100 through a physical or wireless connection.

Once the relation application 110 has found at least one digital image 130, the relation application 110 will proceed to perform at least one facial analysis on individuals included in and/or displayed in the digital images 130. At least one facial analysis includes at least one from the group consisting of a facial recognition analysis, a demographic analysis, and/or a facial similarity measurement.

In one embodiment, while performing at least one facial analysis on the individuals, the relation application 110 additionally organizes and/or sorts the digital images 130 into one or more clusters of digital images 130. A cluster includes and/or lists digital images 130 which a corresponding individual is identified to be included in and/or displayed in. As a result, an individual from the digital images 130 has a corresponding cluster which includes and/or lists the digital images 130 of the individual.

When organizing and/or sorting the digital images 130 into a corresponding cluster, the relation application 110 utilizes a facial recognition analysis to identify which of the digital images 130 a corresponding individual is in. The facial recognition analysis utilizes facial recognition technology, which can be hardware and/or software based. In addition, the facial recognition analysis can be utilized by the relation application 110 to identify where in a corresponding digital image 130 a corresponding individual is located or who a corresponding individual is positioned next to.

When utilizing the facial recognition analysis, the relation application 110 initially captures an image of the corresponding individual's face from one of the digital images 130 and searches the remaining digital images 130 for the corresponding individual's face. The relation application 110 then identifies digital images 130 which the corresponding individual's face is found in and includes those digital images 130 in a cluster corresponding to the corresponding individual. The relation application 110 can repeat this process for one or more of the individuals in the digital images 130.

In other embodiments, clusters can be formed in response to at least one clustering algorithm. When executing a clustering algorithm, the relation application 110 initially creates singleton clusters for each face included in the digital images 130 and performs at least one facial analysis on the singleton clusters to identify similarities between faces in the singleton clusters. In response to at least one of the facial analysis, the relation application 110 will proceed to merge at least two singleton clusters where the corresponding faces in the singleton clusters are identified as the same individual.

Once the relation application 110 has created clusters for the individuals in the digital images 130, the relation application 110 can proceed to rank and/or identify the clusters. In one embodiment, a cluster can be ranked and/or identified as a major cluster, an intermediate cluster, or a low ranked cluster. For the purposes of this application, the relation application 110 labels a cluster as a major cluster when the cluster includes an amount of digital images 130 greater than a predefined threshold. The predefined threshold can be defined by a user and/or the relation application 110.

Additionally, the relation application 110 labels a cluster as an intermediate cluster when the cluster includes an amount of digital images equal to or within a proximity of the predefined threshold. Further, the relation application 110 labels a cluster as a low ranked cluster when the cluster is not labeled as a major cluster or an intermediate cluster.

In another embodiment, the clusters can be ranked as a major cluster, an intermediate cluster, or a low ranked cluster in response to a statistical distribution of the digital images 130. One or more statistical analysis, such as a Gaussian mixed model, can be utilized to determine the distribution of the digital images 130. In other embodiments, a cluster can be labeled as a major, intermediate, and/or low ranked cluster in response to additional considerations in addition to and/or in lieu of those noted above.

Once, the relation application 110 has classified and/or ranked the clusters, the relation application 110 will proceed to identify and/or label individuals from the digital images 130 as members of a nuclear family, extended family members, acquaintances of the nuclear family, and/or strangers. In other embodiments, the relation application 110 can identify and/or label individuals using different classifications in addition to and/or in lieu of those noted above.

In one embodiment, the relation application 110 identifies an individual to be a member of the nuclear family when a corresponding cluster of the individual is ranked as a major cluster, when the individual frequently appears next to other individuals with corresponding major clusters, and/or when the individual includes facial features similar to other individuals with corresponding major clusters or other nuclear family members.

Utilizing the classification and/or label given to a cluster, the relation application 110 can determine whether the corresponding cluster is a major cluster. Additionally, the relation application 110 can utilize the facial recognition analysis to scan the digital images 130 for faces of individuals with corresponding major clusters who appear next to one another.

Further, a facial similarity analysis can be utilized by the relation application 110 to determine whether the corresponding individual has facial features similar to any other individuals with corresponding major clusters. The relation application 110 compares captured images of the individuals' faces to one another. In one embodiment, the relation application 110 compares and searches for similar structures, features, and/or patterns between the faces.

If the relation application 110 determines that an individual has a similar face structure, face feature, and/or face pattern with at least one other individual, then the relation application 110 will determine that the individual and at least one other individual have similar facial features.

Utilizing the results from the facial similarity analysis and the facial recognition analysis, the relation application 110 can proceed to identify individuals with corresponding major clusters, who frequently appear next to other individuals with corresponding major clusters, and/or who have facial similarities similar to other individuals with corresponding major clusters as members of the nuclear family. In other embodiments, the relation application can utilize additional analysis and/or considerations when identifying members of the nuclear family.

Once the relation application 110 has identified members of the nuclear family, the relation application 110 can proceed to identify parents of the nuclear family and any children of the parents. When identifying the parents of the nuclear family, the relation application 110 utilizes a demographic analysis to identify an age and/or gender of members of the nuclear family.

A demographic analysis can be utilized by the relation application 110 to identify an age of a corresponding individual, a gender of the corresponding individual, and/or an ethnicity of the corresponding individual. When utilizing the demographic analysis, the relation application 110 captures an image of the corresponding individual's face and compares the captured face with additional faces of individuals of known genders, known age groups, and known ethnicities. The relation application 110 will scan for matching or similar faces and proceed to utilize a known age, a known gender, and a known ethnicity of the matching individual as a template when identifying and/or estimating the age, gender, and/or ethnicity of the corresponding individual.

In one embodiment, the relation application 110 will label the two oldest members of the nuclear family as parents of the nuclear family. Additionally, the relation application 110 can label any members of the nuclear family which frequently appear to be positioned next to the parents and who are identified to be younger than the parents as children of the nuclear family.

After identifying the parents and any children of the nuclear family, the relation application 110 will proceed to identify extended family members of the nuclear family. In one embodiment, when identifying extended family members, the relation application 110 searches for an individual, with a corresponding major or intermediate cluster, who frequently appears with at least one member of the nuclear family in the digital images 130 and/or who includes facial features similar to at least one member of the nuclear family.

The relation application 110 will then proceed to identify and/or label any individuals who fit the conditions as an extended family member. In other embodiments, the relation application 110 can utilize additional tests and/or considerations when identifying and/or labeling extended family members.

Further, when identifying acquaintances of the nuclear family, the relation application 110 will search for individuals with a corresponding major or intermediate cluster, who do not frequently appear with at least two nuclear family members and/or extended family members, and/or who do not have facial features similar to any members of the nuclear family. The relation application 110 will proceed to identify and/or label any individuals who fit the previous criteria as acquaintances of the nuclear family.

In other embodiments, the relation application 110 can utilize additional tests and/or considerations when identifying and/or labeling acquaintances of the nuclear family. In addition, the relation application 110 will also identify and/or label any individuals with corresponding clusters ranked as low ranked clusters as strangers.

Once the relation application 110 has identified the individuals of the digital images 130 as members of the nuclear family, extended family members, acquaintances, and/or strangers, the relation application 110 will proceed to create and/or render the relation tree.

In one embodiment, when creating the relation tree, the relation application 110 positions the nuclear family members in a center area of the relation tree. Any parents of the nuclear family are positioned at the top of the nuclear family. Additionally, the parents are positioned next to one another and are linked to one another. In one embodiment, utilizing a gender identified from the demographic analysis, the relation application 110 can proceed to position a male parent to the left of the female parent.

Further, the children of the nuclear family are positioned below the parents, linked to the parents, and/or linked to one another. In one embodiment, the children of the nuclear family are positioned from left to right in an order of age, from oldest to youngest. As noted above, an age of a member of the nuclear family can be identified in response to a demographic analysis. In another embodiment, the age of a member of the nuclear family can be identified in response to time stamps in the digital images 130. In other embodiments, the relation application 110 can position members of the nuclear family in addition locations and/or position on the relation tree in addition to and/or in lieu of those noted above.

Once members of the nuclear family are positioned in the relation tree, the relation application 110 will proceed to position any extended family members and any acquaintances of the nuclear family. When positioning an extended family member and/or an acquaintance, the relation application 110 can further determine which of the nuclear family members the corresponding extended family member and/or the acquaintance is associated with.

When identifying which member of the nuclear family member an extended family member is associated with, the relation application 110 will utilize results of the facial similarity analysis to determine which member or members of the nuclear family the extended family member shares facial features with. In another embodiment, when identifying an association, the relation application 110 can utilize results from the facial recognition analysis to determine which member or members of the nuclear family, the extended family member frequently or most often appears with, in the digital images 130. Once the relation application 110 has identified which nuclear family member the extended family member is associated with, the relation application 110 will proceed to link the extended family member with the associated nuclear family member.

In one embodiment, the relation application 110 will also determine whether the extended family member is of a greater age group, the same age group, or a younger age group than the associated family member. The relation application 110 can utilize results from the demographic analysis to identify the age of the extended family member and the associated family member to determine whether to position the extended family member above the associated family member, at the same level of the associated family member, or below the associated family member. The relation application 110 can repeat this process for any individuals identified to be an extended family member.

Once the extended family members have been linked and positioned in the relation tree, the relation application 110 will proceed to link and position any acquaintances in the relation tree. When linking an acquaintance, the relation application 110 identifies which of the members of the nuclear family, the acquaintance is associated with. The relation application 110 can utilize results from the facial recognition analysis to identify which member of the nuclear family, the acquaintance frequently appears with or next to in the digital images 130.

The relation application 110 will then proceed to associate and link the acquaintance with the corresponding member of the nuclear family. The relation application 110 can repeat this process to link and associate any additional acquaintances of the nuclear family on the relation tree.

In one embodiment, after linking and positioning members of the nuclear family, extended family members, and/or acquaintances of the nuclear family, the relation application 110 will proceed to render the relation tree for one or more users to view on a digital display device 160.

The digital display device 160 is a display device that can create and/or project one or more images and/or videos for display. In one embodiment, the digital display device 160 can be a monitor and/or a television. In another embodiment, the digital display device 160 is a projector that can project one or more images and/or videos.

In other embodiments, the relation application 110 can send and/or share the relation tree with additional machines and/or devices accessible by a user to view the relation tree.

Figure 2A:
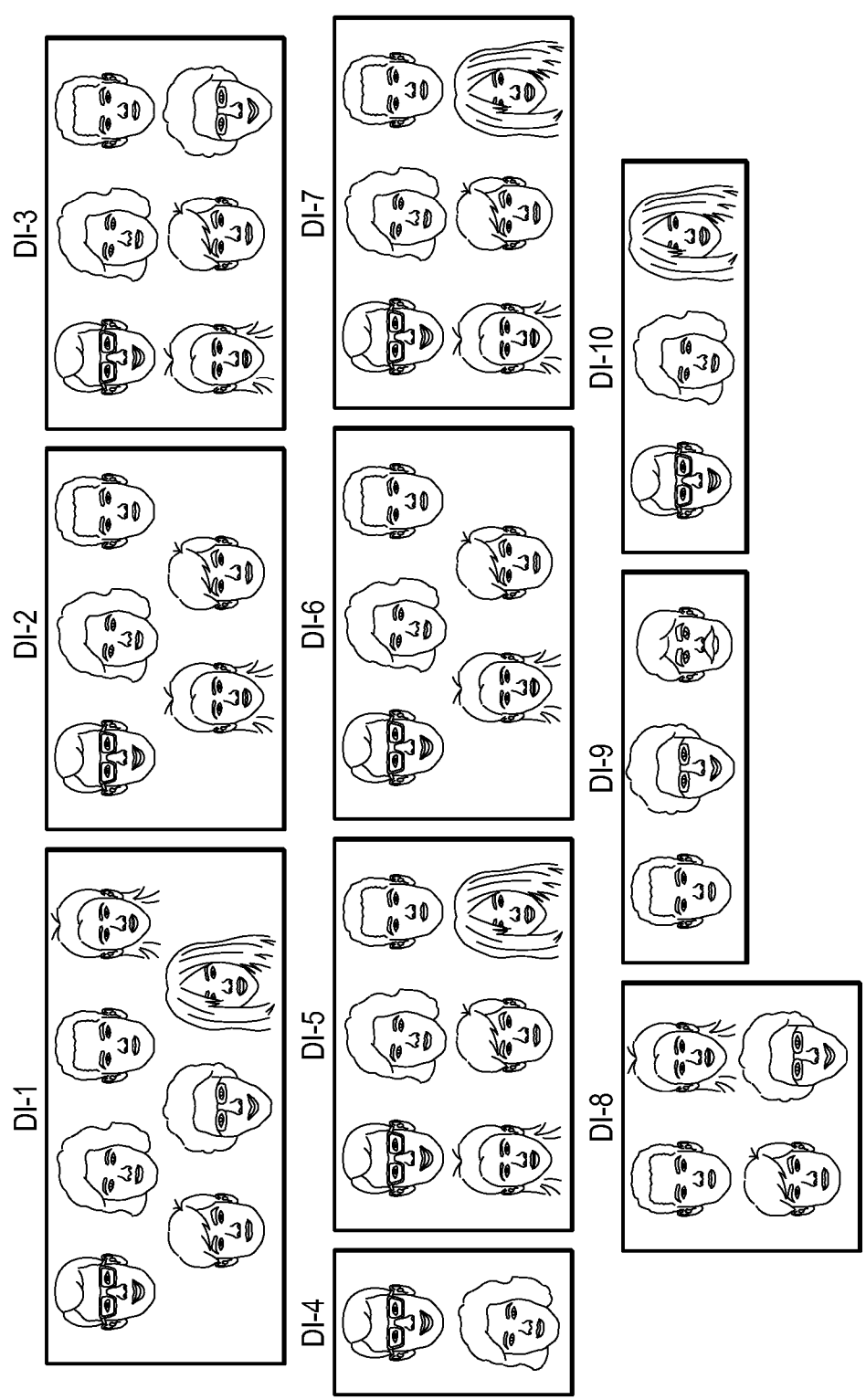

FIG. 2A and FIG. 2B illustrate a relation application 210 creating clusters in response to at least one facial analysis performed on digital images (DI) according to an embodiment of the invention. As illustrated in FIG. 2A, the relation application can initially access digital images (DI) 1, 2, 3, 4, 5, 6, 7, 8, 9, and 10. Additionally, as illustrated in FIG. 2A, the digital images (DI) can include and/or display one or more individuals.

As illustrated in FIG. 2B, the relation application 210 capture images of the individual's faces from the digital images (DI) 1, 2, 3, 4, 5, 6, 7, 8, 9, and 10 and proceed to perform at least one of the facial analysis on the faces of the individuals. Further, as noted above, at least one facial analysis can include a facial recognition analysis, a demographic analysis, and/or a facial similarity analysis. In one embodiment, one or more of the facial analysis can be performed concurrently by the relation application 210. In other embodiments, one or more of the facial analysis can be performed sequentially and/or at different times from one another.

In one embodiment, the relation application 210 initially performs a facial recognition analysis on the individuals' faces. As noted above, when performing the facial recognition analysis on an individual, the relation application 210 utilizes an individual's face as a reference and proceeds to identify digital images (DI) where the individual's face is found.

Additionally, utilizing the facial recognition analysis, the relation application 210 identifies where in a digital image the individual is positioned, who else is in a digital image, and/or who the individual is positioned next to. The relation application 210 can repeat this process for other individuals in the digital images (DI).

In response to the facial recognition analysis, the relation application 210 can create clusters for the individuals included in the digital images. As noted above, an individual has a corresponding cluster which lists and/or includes digital images where the individual is identified to be present in.

As illustrated in FIG. 2A, in one embodiment, the relation application 210 initially accesses digital image 1 and captures an image of the first individual in digital image (DI-1). As shown in FIG. 2A, the relation application 210 copies Individual 1's face to utilize when scanning the digital images. Because individual 1's face is captured from DI-1, the relation application notes that Individual 1 is included in DI-1 and does not scan DI-1.

Utilizing the image of Individual 1's face, the relation application 210 can proceed to scan digital images (DI) 2, 3, 4, 5, 6, 7, 8, 9, and 10 for Individual 1's face to determine whether Individual 1 is also present in digital images (DI) 2, 3, 4, 5, 6, 7, 8, 9, and 10. As shown in the present embodiment, the relation application 210 determines that individual 1 is present in digital images (DI) 1, 2, 3, 4, 5, 6, 7, and 10. As a result, the relation application 210 creates Cluster 1 and lists and/or includes digital images (DI) 1, 2, 3, 4, 5, 6, 7, and 10 in Cluster 1.

The relation application 210 will then move onto the next individual in digital image (DI) 1, Individual 2. Utilizing the same process disclosed above, the relation application 210 will proceed to copy an image of Individual 2's face from digital image (DI) 1. Additionally, the relation application 210 will utilize facial recognition technology and Individual 2's face as a reference when searching in digital images (DI) 2, 3, 4, 5, 6, 7, 8, 9, and 10 to determine whether Individual 2 is present in any other digital images.

In response to results from the facial recognition analysis, as illustrated in FIG. 2B, the relation application 210 creates Cluster 2 corresponding to Individual 2 and lists and/or includes digital images (DI) 1, 2, 3, 4, 5, 6, 7, and 10 to indicate that Individual 2 is present in those digital images.

The relation application 210 will continue to utilize this process for the individuals present in the digital images (DI) 1, 2, 3, 4, 5, 6, 7, 8, 9, and 10. In response to continuing this process, as illustrated in FIG. 2B, the relation application 210 has created Cluster 3 corresponding to Individual 3 and lists and/or includes digital images (DI) 1, 2, 3, 5, 6, 7, 8, and 9 in Cluster 3. Further, the relation application 210 creates Cluster 4, corresponding to Individual 4, and lists and/or includes digital images (DI) 1, 2, 3, 5, 6, 7, and 8.

In addition, the relation application 210 creates Cluster 5, corresponding to Individual 5, Cluster 6 corresponding to Individual 6, Cluster 7 corresponding to Individual 7, and Cluster 8 corresponding to Individual 8. As illustrated in FIG. 2B, Cluster 5 lists and/or includes digital images (DI) 1, 2, 3, 5, 6, 7, and 8, Cluster 6 lists and/or includes digital images (DI) 1, 3, 8, and 9, Cluster 7 lists and/or includes digital images (DI) 1, 5, 7, and 10, and Cluster 8 lists and/or includes digital image 9.

As a result, Clusters 1, 2, and 3 list and/or include 8 digital images. Additionally, Clusters 4 and 5 list and/or include 7 digital images. Further, Clusters 6 and 7 list and/or include 4 digital images. In addition, Cluster 8 lists and/or includes 1 digital image.

In another embodiment, all of the individuals' faces in the digital images (DI) 1, 2, 3, 4, 5, 6, 7, 8, 9 and 10 are entered into a collection. A similarity matrix is then created and computed by the relation application 210, where similarities between faces are included as entries. The relation application 210 then applies at least one clustering algorithm to the similarity matrix when grouping the faces into clusters. As noted above, the clusters correspond to an individual from the digital images.

A clustering algorithm can be any existing clustering algorithm such as an agglomerative algorithm, a K-nearest neighbor algorithm, and/or a K-means algorithm. In one embodiment, when utilizing an agglomerative algorithm, the relation application 210 begins with an initial partition where each digital image forms a singleton cluster. Utilizing results from the agglomerative algorithm, the relation application 210 merges the two most similar clusters into a cluster. The relation application 210 continues to merge clusters until a similarity value between the two merging clusters falls below a predefined stopping threshold or until a specified number of clusters have been obtained.

As noted above, once the relation application 210 has created corresponding clusters for the individuals, the relation application 210 can proceed to classify and/or rank the clusters. In another embodiment, before classifying and/or ranking the clusters, relation application 210 can initially group the clusters into age group clusters in response to whether a corresponding individual from a cluster is identified to be a child or an adult. As noted above, a demographic analysis and/or time stamps of the digital images can be utilized to identify an age of a corresponding individual.

Figure 3:
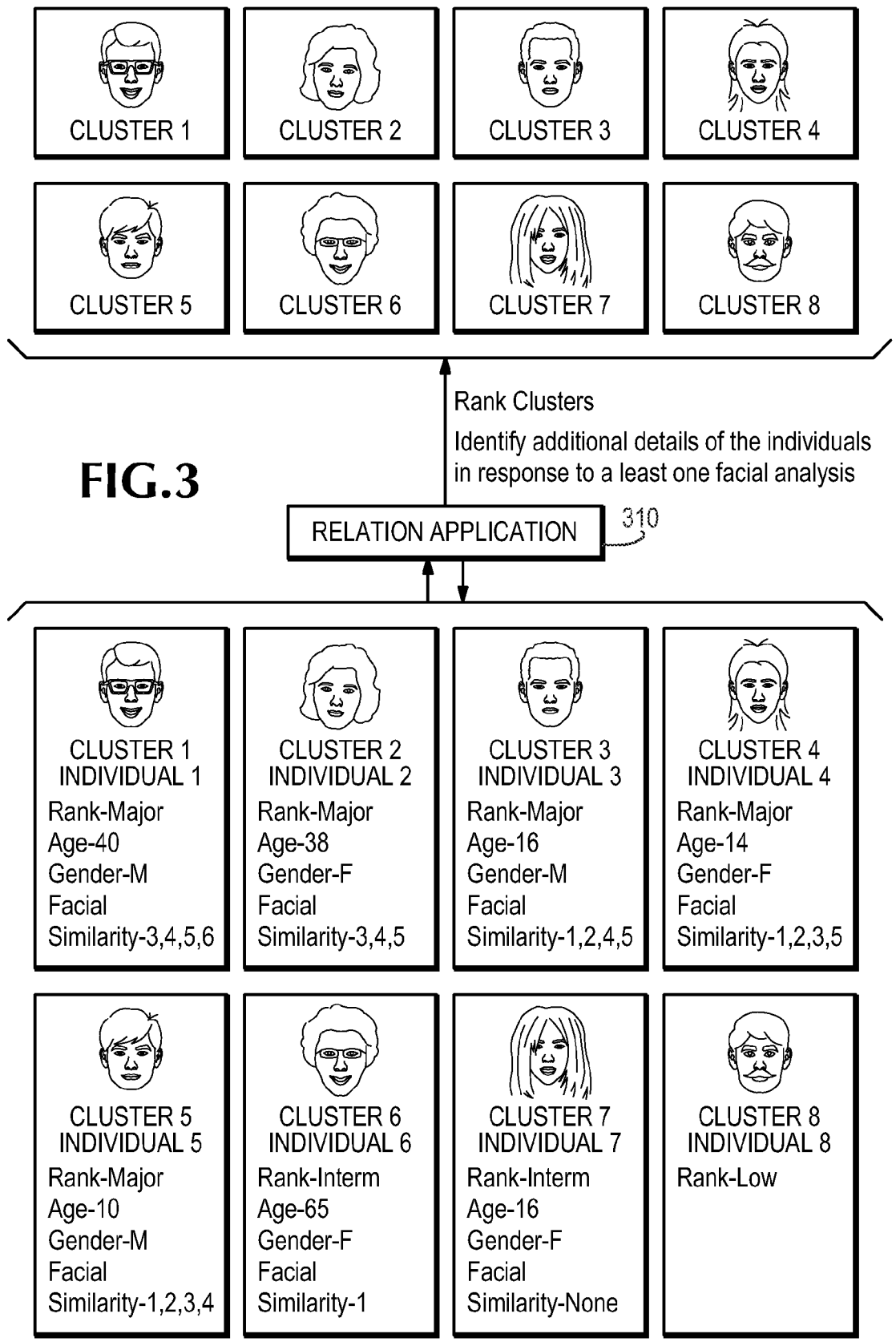
FIG. 3 illustrates clusters being classified and additional details of individuals being identified in response to at least one facial analysis according to an embodiment of the invention.

FIG. 3 illustrates clusters being classified and additional details of individuals being identified in response to at least one facial analysis according to an embodiment of the invention. As noted above, and as illustrated in FIG. 3, the clusters correspond to an individual from digital images. Additionally, a relation application 310 can classify and/or rank the clusters as a major cluster, an intermediate cluster, and/or a low ranked cluster in response to at least one facial analysis.

As noted above, the relation application 310 can rank and/or classify a cluster as a major cluster when the amount of digital images included in the cluster exceeds a predefined amount. In another embodiment, the relation application 310 ranks and/or classifies a cluster as an intermediate cluster when the amount of digital images included in the cluster is equal or within a proximity of the predefined amount. Additionally, the relation application 310 ranks and/or classifies a cluster as a low ranked cluster when the cluster is not classified as a major cluster or an intermediate cluster. In other embodiments, the relation application 310 can rank and/or classify the clusters in response to at least one statistical analysis, such as a Gaussian mixture model analysis.

As noted above, the predefined amount can be defined by a user and/or the relation application 310. In one embodiment, the relation application 310 has identified the predefined amount to be 4 digital images. As a result, as illustrated in FIG. 3, the relation application 310 proceeds to rank and/or classify the clusters in response to the predefined amount of 4.

As shown previously in FIG. 2B, Clusters 1, 2, and 3 list and/or include 8 digital images. Additionally, Clusters 4 and 5 list and/or include 7 digital images. Further, Clusters 6 and 7 list and/or include 4 digital images. In addition, Cluster 8 lists and/or includes 1 digital image. As a result, as illustrated in FIG. 3, the relation application 310 classifies and/or ranks Clusters 1, 2, 3, 4, and 5 as major clusters since the amount of digital images in the clusters exceed the predefined amount of 4. Additionally, the relation application 310 classifies and/or ranks Clusters 6 and 7 as intermediate clusters since the amount of digital images in the clusters is equal to the predefined amount of 4.

Further, Cluster 8 is classified and/or ranked as a low rank cluster since it has not been classified and/or ranked as a major cluster or an intermediate cluster. In other embodiments, the clusters can be ranked and/or classified using additional considerations in addition to and/or in lieu of those noted above.

As noted above, additional details of a corresponding individual can be identified in response to at least one of the facial analysis. As noted previously, at least one of the facial analyses can include a demographic analysis and/or a facial similarity analysis. In one embodiment, the demographic analysis can be utilized by the relation application 310 to identify an age, gender, and/or ethnicity of an individual. Additionally, the facial similarity analysis can be utilized by the relation application to identify which of the individuals include facial features which are similar to one another.

In one embodiment, the demographic analysis can be applied to all of the digital images of a corresponding individual in a cluster to insure accuracy when identifying an age, gender, and/or ethnicity of a corresponding individual. Utilizing the demographic analysis, the relation application 310 identifies an age, gender, and/or ethnicity of the corresponding individual in all of the digital images from the cluster. Once, an age, gender, and/or ethnicity has been identified for all of the digital images in the cluster, the relation application 310 can utilize a most frequent or majority age, gender, and/or ethnicity identified from the digital images as the corresponding individual's age, gender, and/or ethnicity.

As noted above, when performing the demographic analysis, the relation application 310 uses a captured image of an individual's face and compares the captured face with additional faces of individuals of known genders, known age groups, and known ethnicities. The relation application 310 then scans for matching or similar faces and proceed to utilize a known age, a known gender, and a known ethnicity of the matching individual as a template when identifying the age, gender, and/or ethnicity of an individual.

In other embodiments, the relation application 310 includes a learning mechanism or uses a learning machine to identify and/or estimate an age, gender, and/or ethnicity of an individual. The learning mechanism and/or the learning machine can be trained with faces of individuals with known ages, known genders, and/or known ethnicities. Utilizing the foundation of the faces, with known ages, known genders and/or known ethnicities, the relation application 310 can identify and/or estimate the age, gender and/or ethnicity of an individual.

Additionally, when performing the facial similarity analysis, the relation application 310 compares captured images of the individuals' faces to one another. In one embodiment, the relation application 310 compares and searches for similar structures, features, and/or patterns between the individuals' faces.

As illustrated in FIG. 3, in response to the demographic analysis and/or the facial similarity analysis performed on Individual 1's face, the relation application 310 has identified that Individual 1 is a male of the age 40 and Individual 1 has facial features which are similar to Individuals 3, 4, 5, and 6. Additionally, the relation application 310 has identified that Individual 2 is a female of the age of 38 and Individual 2 has facial similarities with individuals 3, 4, and 5.

Further, the relation application 310 has identified that Individual 3 is a male of the age of 16 and has facial features similar with Individuals 1, 2, 4, and 5, Individual 4 is a female of the age 14 and has facial features similar to Individuals 1, 2, 3, and 5, and Individual 5 is a male of the age of 10 and has facial features similar to Individuals 1, 2, 3, and 4. In addition, the relation application has identified that Individual 6 is a female of the age 65 and has facial features similar to Individual 1 and Individual 7 is a female of the age 16 and does not have facial features similar to any of the other individuals.

Further, as illustrated in FIG. 3, in one embodiment, in response to having a low ranked cluster, the relation application 310 does not perform a demographic analysis and/or a facial feature analysis on Individual 8.

Figure 4:
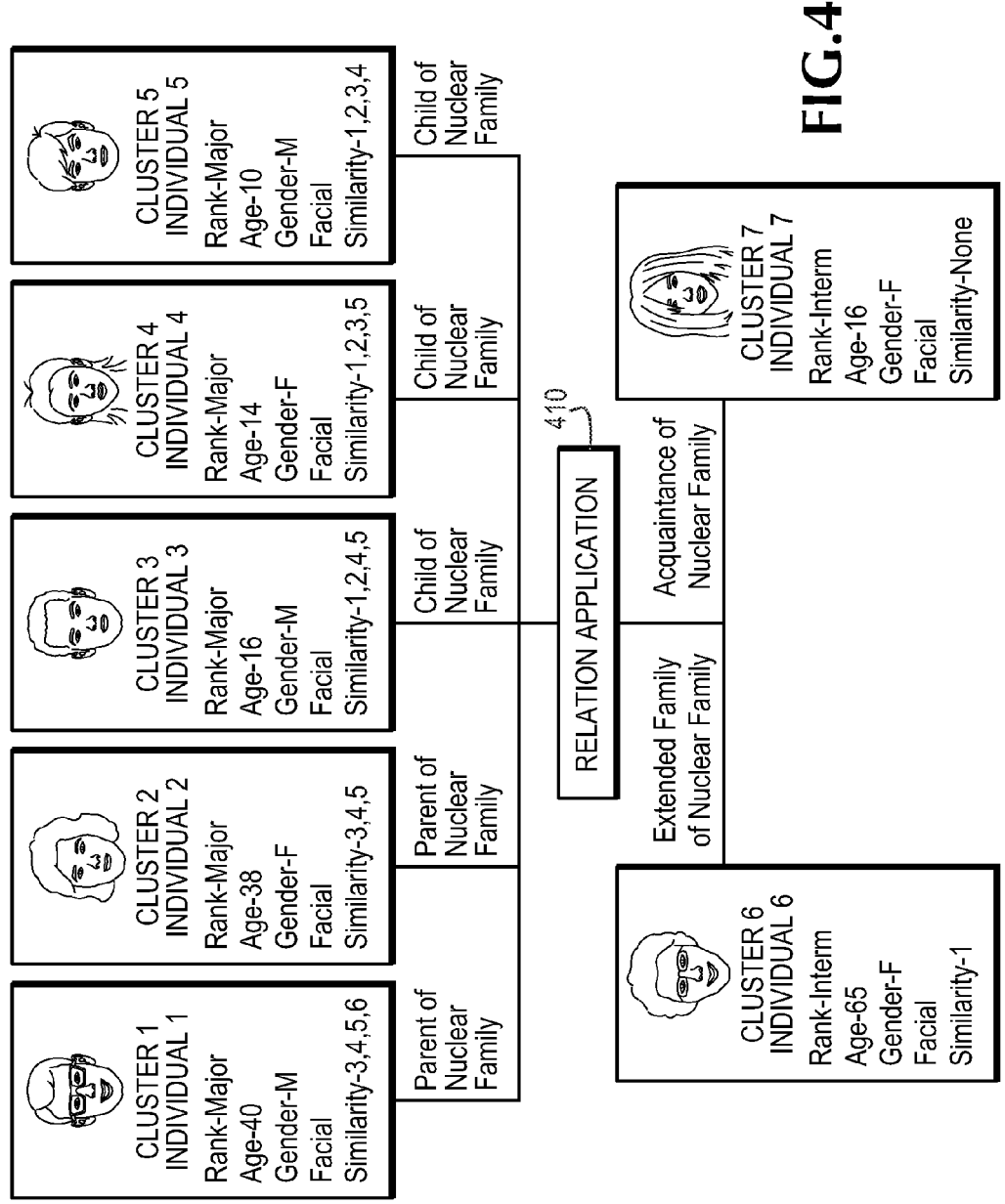
FIG. 4 illustrates individuals being identified as members of a nuclear family, extended family members, acquaintances of the nuclear family, and/or strangers according to an embodiment of the invention.

FIG. 4 illustrates individuals being identified as members of a nuclear family, extended family members, acquaintances of the nuclear family, and/or strangers according to an embodiment of the invention. As noted above and as illustrated in FIG. 4, the individuals have corresponding clusters and details of the individuals have been identified in response to at least one facial analysis performed by a relation application 410.

In one embodiment, as noted above, the relation application 410 identifies individuals as a member of the nuclear family when an individual has a corresponding major cluster, when the individual frequently appears next to at least one individual with a corresponding major cluster, and/or when the individual includes facial features similar to other individuals with corresponding major clusters and/or with other nuclear family members.

As illustrated in FIG. 4, the relation application 410 initially scans the ranks and/or classifications of clusters 1 through 7. The relation application 410 determines that clusters 1 through 5 are classified or ranked as major clusters. Additionally, Individuals 1 through 5 correspond with major clusters 1 through 5. Once the major clusters and the corresponding individuals have been identified, the relation application 410 proceeds to access the details of the individuals to determine whether they frequently appear next to one another in the digital images and whether they include facial features which are similar to one another.

As illustrated in FIG. 4, the relation application 410 determines that Individual 1 has facial features similar to Individuals 3, 4, 5, and 6, Individual 2 has facial features similar to Individuals 3, 4, and 5, Individual 3 has facial features similar to Individuals 1, 2, 4, and 5, Individual 4 has facial features similar to Individuals 1, 2, 3, and 5, and Individual 5 has facial features similar to Individuals 1, 2, 3, and 4. As a result, the relation application determines that Individuals 1 through 5 have facial features similar to one another.

Additionally, utilizing results from a facial recognition analysis, the relation application 410 has determined that Individuals 1 through 5 frequently appeared next to one another in the digital images previously displayed in FIG. 2A. As a result, the relation application 410 identifies Individuals 1 through 5 to be members of the nuclear family.

As noted above, the relation application 410 can additionally identify parents of the nuclear family and any children of the nuclear family. In one embodiment, the relation application identifies individuals who are the oldest members of the nuclear family, and/or who appear next to one another as parents of the nuclear family. As illustrated in FIG. 4, the relation application 410 identifies that Individuals 1 and 2 are the oldest members of the nuclear family.

Further, utilizing results from the facial recognition analysis, the relation application 410 determines that Individuals 1 and 2 frequently appear next to one another in the digital images previously displayed in FIG. 2A. As a result, the relation application identifies Individuals 1 and 2 to be the parents of the nuclear family.

Once the parents have been identified, the relation application identifies individuals who are younger than the parents and who frequently appear next to the parents as children of the nuclear family. As illustrated in FIG. 4, Individuals 3, 4, and 5 are younger than the parents. Additionally, utilizing results from the facial recognition analysis, the relation application 410 determines that Individuals 3, 4, and 5 frequently appear next to the parents in FIG. 2A. As a result, the relation application identifies Individuals 3, 4, and 5 to be children of the nuclear family.

After identifying the members of the nuclear family, the relation application 410 proceeds to identify extended family members. In one embodiment, the relation application 410 identifies an individual to be an extended family member when the individual has a corresponding intermediate or major cluster, the individual frequently appears with or in the same digital image as at least one member of the nuclear family in the digital images, and/or when the individual includes facial features similar to another nuclear family member.

As illustrated previously in FIG. 2, the relation application 410 identifies that Individuals 6 and 7 have corresponding clusters ranked as intermediate. Further, the relation application 410 identifies that Individual 6 has facial similarities similar to Individual 1 and Individual 6 frequently appears in digital images with at least one nuclear family member. As a result, the relation application proceeds to classify Individual 6 as an extended family member.

Additionally, the relation application 410 identifies individuals, with corresponding major or intermediate clusters, which do not frequently appear with at least two members of the nuclear family and/or extended family members, and which do not include facial features similar to any members of the nuclear family as acquaintances of the nuclear family. In one embodiment, the relation application additionally classifies any individuals with a corresponding low ranked cluster as strangers.

As illustrated in FIG. 4, the relation application 410 identifies that Individual 7 has a cluster ranked and/or classified as intermediate and Individual 7 frequently appears with a member of the nuclear family. However, Individual 7 does not appear with at least two nuclear and/or extended family members and Individual 7 does not have facial features similar to any members of the nuclear family. As a result, the relation application identifies Individual 7 to be an acquaintance of the nuclear family.

In other embodiments, the when identifying members of the nuclear family, extended family members, acquaintances, and/or strangers, the relation application 410 can group clusters together where the corresponding individuals from the clusters are of a similar age group. Utilizing the groups of, clusters, the relation application 410 can proceed to create and organize a relation tree such that the corresponding individuals are linked in response to their age.

Figure 5:
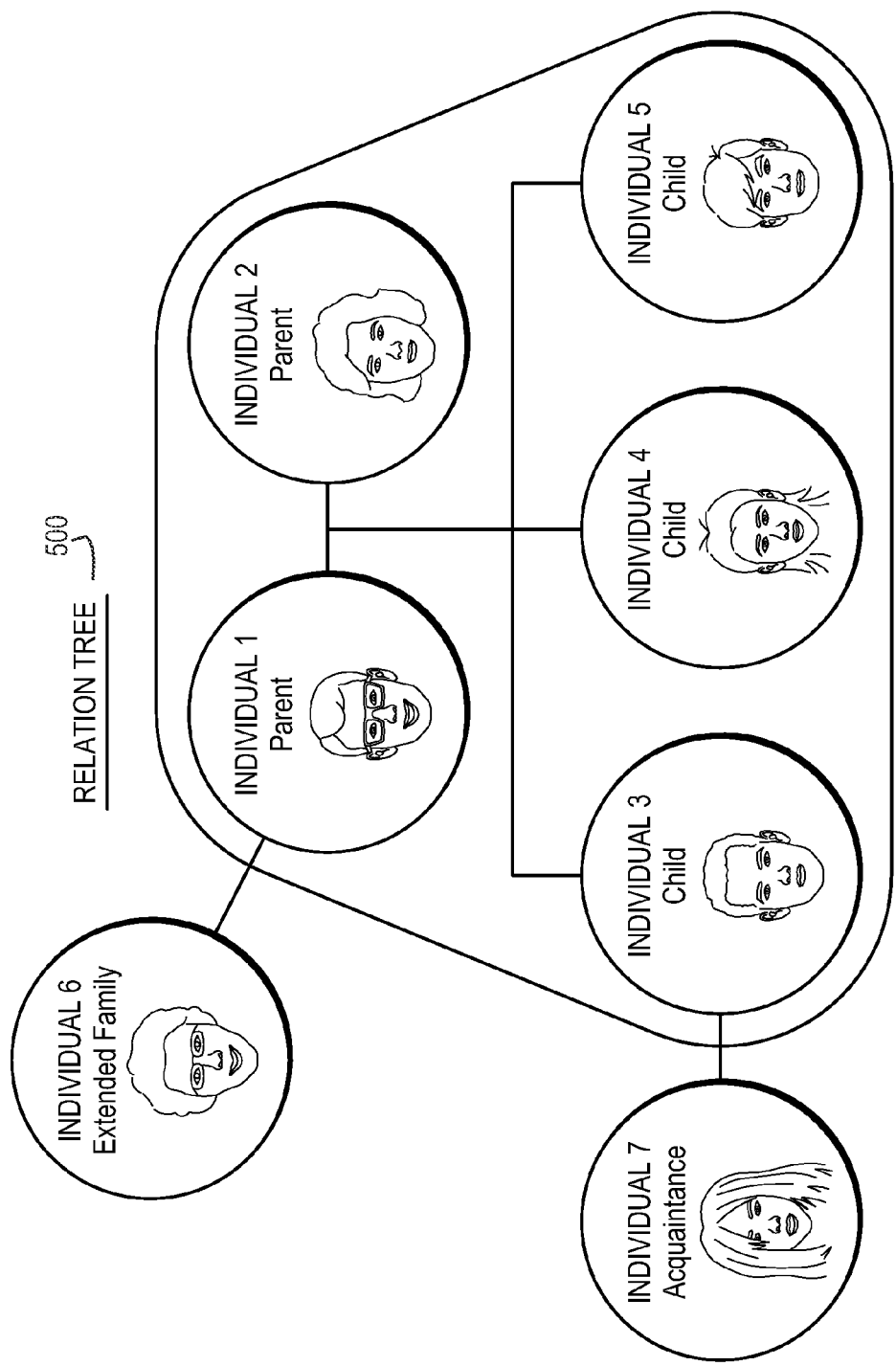
FIG. 5 illustrates a relation tree being created and organized according to an embodiment of the invention.

FIG. 5 illustrates a relation tree 500 being created and organized according to an embodiment of the invention. As noted above, the relation tree 500 can by created and organized by a relation application such that members of the nuclear family are linked to one another and individuals associated with the nuclear family are linked to the nuclear family.

As noted above and as illustrated in FIG. 5, Individuals 1, 2, 3, 4, and 5 have been identified by the relation application as members of the nuclear family. Additionally, Individuals 1 and 2 have been identified as the parents of the nuclear family and Individuals, 3, 4, and 5 have been identified as children of the nuclear family.

As illustrated in FIG. 5, in one embodiment, the relation tree 500 is organized such that members of the nuclear family are at a central position of the relation tree 500. Additionally, the parents, Individuals 1 and 2, are positioned at the top of the nuclear family and are linked to one another. Additionally, the children, Individuals 3, 4, and 5, are positioned below the parents and are linked to the parents and to one another.

Further as noted above, Individual 6 has been identified to be an extended family member and Individual 7 has been identified to be an acquaintance. As illustrated in FIG. 5, in response to Individual 6 having facial similarities to Individual 1 and being older than Individual 1, Individual 6 is linked to Individual 1 and is positioned above Individual 1.

Additionally, as illustrated in FIG. 5, in response to Individual 7 appearing most frequently with Individual 3 and Individual 7 being the same age as Individual 3, Individual 7 is linked to Individual 3 and appears next to Individual 3. In other embodiments, the relation tree 500 can be created and/or organized utilizing additional methods and/or considerations in addition to and/or in lieu of those noted above.

Figure 6:
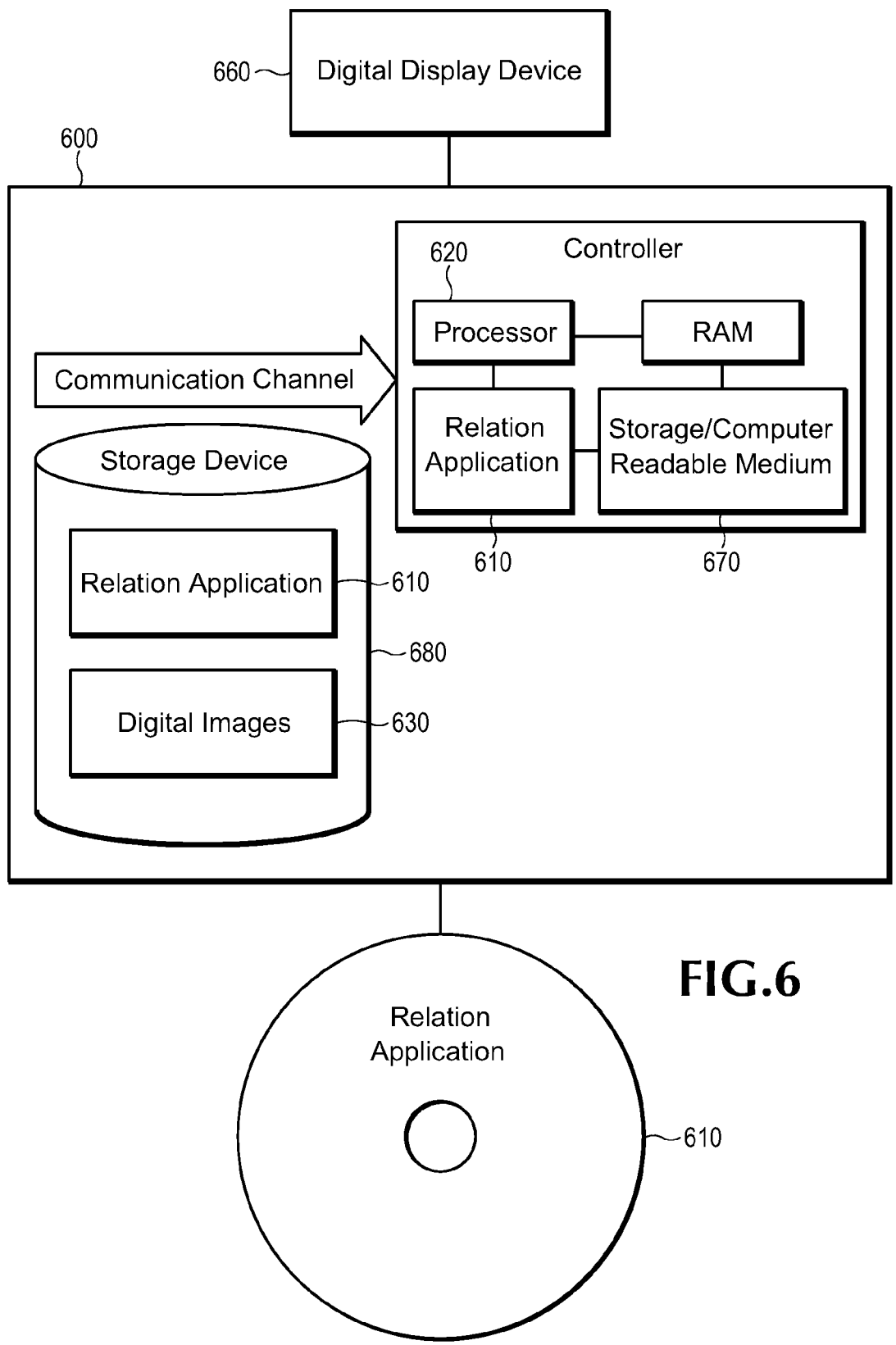
FIG. 6 illustrates a machine with an embedded relation application and a relation application stored on a removable medium being accessed by the machine according to an embodiment of the invention.

FIG. 6 illustrates a machine 600 with an embedded relation application 610 and a relation application 610 stored on a removable medium being accessed by the machine 600 according to an embodiment of the invention. For the purposes of this description, a removable medium is any tangible apparatus that contains, stores, communicates, or transports the application for use by or in connection with the machine

600. As noted above, in one embodiment, the relation application 610 is firmware that is embedded into one or more components of the machine 600 as ROM. In other embodiments, the relation application 610 is a software application which is stored and accessed from a hard drive, a compact disc, a flash disk, a network drive or any other form of computer readable medium that is coupled to the machine 600.

Figure 7:
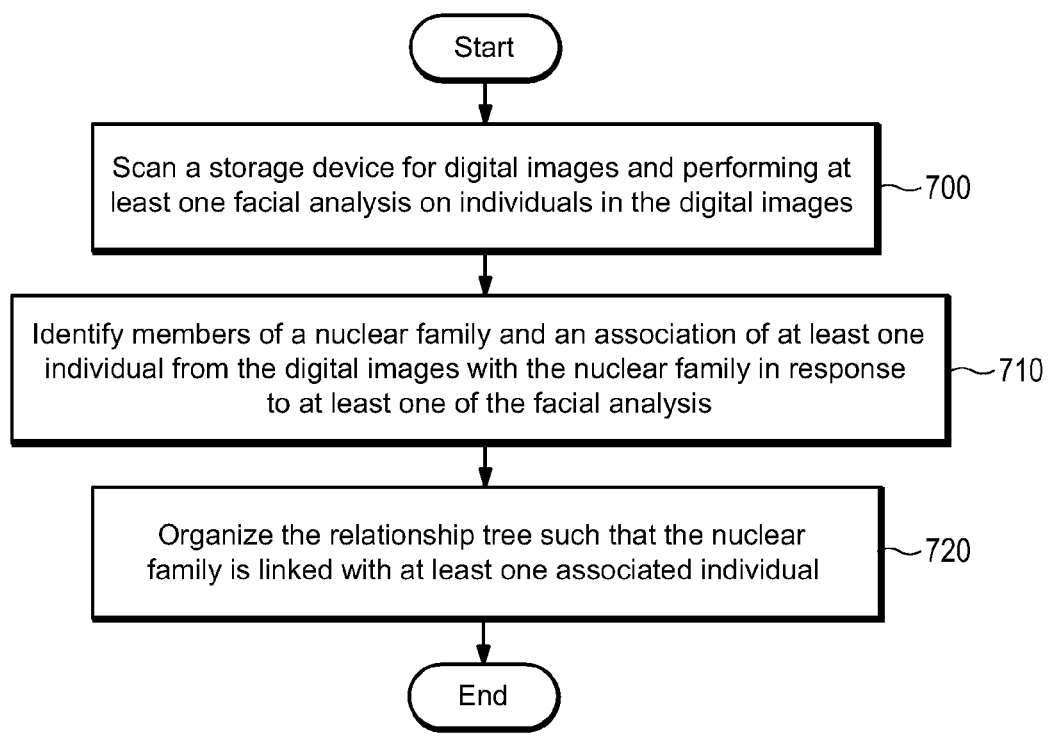
FIG. 7 is a flow chart illustrating a method for creating a relation tree according to an embodiment of the invention.

FIG. 7 is a flow chart illustrating a method for creating a relation tree according to an embodiment of the invention. The method of FIG. 7 uses a machine coupled to storage device, a processor, a relation application, and/or a digital display device. As noted above, digital images are stored on the storage device. In other embodiments, the method of FIG. 7 uses additional components and/or devices in addition to and/or in lieu of those noted above and illustrated in FIGS. 1, 2, 3, 4, 5, and 6.

As noted above, the relation application in conjunction with a processor initially scans a storage device for digital images and proceeds to perform at least one facial analysis on the digital images 700 found on the storage device. Additionally, as noted above, at least one of the facial analysis can include a facial recognition analysis, a demographic analysis, and/or a facial similarity analysis. In other embodiments, at least one of the facial analysis can include additional analysis and/or tests in addition to and/or in lieu of those noted above.

In one embodiment, a facial recognition analysis can be utilized by the relation application to identify which of the digital images a corresponding individual is displayed and/or included in and how many digital images the corresponding individual is displayed and/or included in. Additionally, the facial recognition analysis can be utilized to identify who the corresponding individual is positioned next to in the digital images.

Further, a demographic analysis can be utilized by the relation application to identify an age, gender, and/or ethnicity of a corresponding individual. In addition, a facial similarity analysis can be utilized by the relation application to identify which of the other individuals from the digital images the corresponding individual has similar facial features with.

As noted above, in one embodiment, the relation application additionally organizes the digital images in clusters which correspond to the individuals in the digital images. A cluster includes and/or lists digital images which a corresponding individual is included in and/or displayed in. Further, the relation application can create clusters for one or more of the individuals displayed and/or included in the digital images.

Additionally, the clusters can be classified and/or ranked in response to an amount of digital images included in the clusters. In one embodiment, clusters with an amount of digital images greater than a predefined amount are classified as major clusters. Additionally, clusters with an amount of digital images equal to or within a proximity of the predefined amount are classified as intermediate clusters. Further, clusters which are not ranked as major or intermediate clusters are classified as low ranking clusters.

Once the clusters have been created and ranked for the individuals, the relation application will proceed to identify members of a nuclear family and an association of at least one individual from the digital images with the nuclear family in response to at least one of the facial analysis 710. As noted above, when identifying the nuclear family, the relation application identifies members of the nuclear family in response to a size of a corresponding individual's cluster, results from the facial recognition analysis, and/or results from the facial similarity analysis.

In one embodiment, the relation application classifies an individual as a member of the nuclear family when the cluster corresponding to the individual is classified as major, when the individual frequently appears next to individuals with corresponding major clusters in the digital images, and/or when the individual includes facial features similar to at least one individual with corresponding major clusters or at least one nuclear family member.

Additionally, the relation application can utilize an age or gender identified from the demographic analysis to identify one or more parents of the nuclear family and/or any children of a parent. Further, the relation application can utilize the results from the demographic analysis to determine where to position one or more of the nuclear family members.

Once the relation application has identified the members of the nuclear family, the relation application will proceed to identify an association other individuals with members of the nuclear family. As noted above, an individual associated with a member of the nuclear family can be an extended family member, an acquaintance of the nuclear family, and/or a stranger.

As noted above, in one embodiment, any individual with a corresponding cluster classified as a low ranking cluster is classified as a stranger. Additionally, the relation application can identify an individual as an extended family member when the individual has a corresponding cluster ranked as a major cluster or an intermediate cluster, when the individual frequently appears with or in the same digital images as at least one member of the nuclear family, and/or when the individual includes facial features similar to at least one nuclear family member.

Further, an individual can be identified by the relation application to be an acquaintance of the nuclear family when the individual has a corresponding cluster ranked as a major cluster or an intermediate cluster, when the individual does not frequently appear with at least two members of the nuclear family and/or an extended family members, and/or when the individual does not include facial features similar to at least one member of the nuclear family. In other embodiments, the relation application can classify an individual as an extended family member and/or an acquaintance of the nuclear family using additional analysis and/or in response to other conditions in addition to and/or in lieu of those noted above.

Once, the individuals from the digital images have been identified by the relation application, the relation application will proceed to create and organize the relation tree such that members of the nuclear family are linked to one another and at least one other individual associated with the nuclear family is linked to the nuclear family 720. As noted above, in one embodiment, the relation tree can be rendered for display by the relation application on a digital display device. In other embodiments, the method of FIG. 7 includes additional steps in addition to and/or in lieu of those depicted in FIG. 7.

FIG. 8 is a flow chart illustrating a method for creating a relation tree according to another embodiment of the invention. Similar to the method disclosed in FIG. 7, the method of FIG. 8 uses a machine coupled to storage device, a processor, a relation application, and/or a digital display device. As noted above, digital images are stored on the storage device. In other embodiments, the method of FIG. 8 uses additional components and/or devices in addition to and/or in lieu of those noted above and illustrated in FIGS. 1, 2, 3, 4, 5, and 6.

As noted above, the relation application sends one or more instructions for a processor to scan a storage device for digital images and perform at least one facial analysis on individuals in the digital images 800. In one embodiment, at least one of the digital images can be stored on an additional device and can be accessed by the relation application through a physical or wireless connection.

Additionally, as noted above, at least one of the facial analysis can include at least one from the group consisting of a facial recognition analysis, a demographic analysis, and/or a facial similarity analysis. In one embodiment, when performing the facial recognition analysis on an individual, the relation application captures a face of the individual from the digital images and proceeds to identify digital images where the individual's face is found.

Additionally, the relation application identifies where in a digital image the individual is positioned, who else is in the digital image, and/or who the individual is positioned next to. The relation application can repeat this process for other individuals in the digital images.

Further, when performing the demographic analysis, the relation application utilizes the captured image of an individual's face and compares the individual's face to other individuals where an age, a gender, and/or an ethnicity of the other individuals are known. By comparing the individual's faces to other individuals, the relation application uses the other individuals known age, gender, and/or ethnicity as a template when identifying the individual's age, gender, and/or ethnicity. The relation application can repeat this process for other individuals in the digital images.

In addition, when performing the facial similarity analysis, the relation application compares captured faces of the individuals from the digital images and searches for similar facial structures, facial features, and/or facial patterns between the individuals. The relation application can then proceed to mark individuals who have similar facial features and list individuals which a corresponding individual has similar facial features with.

Utilizing the results from at least one of the facial analysis, the relation application proceeds to organize the digital images in clusters 810. Additionally, the relation application can rank and/or classify clusters in response to at least one of the facial analysis 820.

In one embodiment, a cluster with an amount of digital images greater than a predefined amount is defined and/or classified as a major cluster. As noted above, the predefined amount can be defined by a user or the relation application. Additionally, the relation application classifies clusters with an amount of digital images equal to or within a proximity of the predefined amount as intermediate clusters. Further, the relation application classified clusters which are not classified as a major cluster or an intermediate cluster as a low ranked cluster.

Once the clusters have been classified, the relation application will proceed to identify members of nuclear family, extended family members, acquaintances of the nuclear family, and/or strangers. As noted above, the relation application identifies an individual as a member of the nuclear family when the individual has a corresponding major cluster, when the individual frequently appears next to at least one individual with a corresponding major cluster, and/or when the individual includes facial features similar to other individuals with corresponding major clusters and/or with other nuclear family members 830.

Additionally, the relation application identifies individuals who are the oldest members of the nuclear family, and/or who appear next to one another as parents of the nuclear family. Further, the relation application identifies individuals who are younger than the parents and who frequently appear next to the parents as children of the nuclear family 840.

After identifying the members of the nuclear family, the relation application proceeds to identify extended family members. In one embodiment, the relation application identifies an individual to be an extended family member when the individual has a corresponding intermediate or major cluster, the individual frequently appears with or in the same digital image as at least one member of the nuclear family in the digital images, and/or when the individual includes facial features similar to another nuclear family member 850.

Additionally, the relation application identifies individuals, with corresponding major or intermediate clusters, which do not frequently appear with at least two individuals identified to be members of a nuclear family and/or extended family members, and which do not include facial features similar to any members of the nuclear family as acquaintances of the nuclear family 860. In one embodiment, the relation application additionally classifies any individuals with a corresponding low ranked cluster as strangers.

As noted above, in one embodiment, the relation application additionally identifies which member of the nuclear family an extended family member and/or an acquaintance is associated with 870. Additionally, as noted above, the relation application can determine which member of the nuclear family an extended family member or an acquaintance is associated with in response to results from the facial similarity analysis and/or a position of the extended family member or the acquaintance with regard to a member of the nuclear family.

The relation application can then proceed to create and/or organize the relation tree such that members of the nuclear family are linked to one another and extended family members and acquaintances are linked to associated members of the nuclear family 880. As noted above, the relation application can also configure a digital display device to render the relation tree.

The method is then complete or the relation application can continue to create, organize, and/or render the relation tree in response to at least one facial analysis performed on individuals from digital images. In other embodiments, the method of FIG. 8 includes additional steps in addition to and/or in lieu of those depicted in FIG. 8.

By performing at least one facial analysis on digital images, members of a nuclear family can efficiently and accurately be identified. Additionally, by identifying and associating one or more individuals in the digital images with members of the nuclear family, the individuals can be linked with members of the nuclear family in a relation tree. As a result, a relation tree can conveniently be created for a user to view where members of the nuclear family are linked with one another and associated individual are linked with the nuclear family.

What is claimed is:

1. A method for creating a relation tree comprising:
scanning a storage device for digital images and performing at least one facial analysis on individuals in the digital images;
identifying members of a nuclear family and an association of an individual from the digital images with the nuclear family in response to at least one of the facial analysis; and
organizing the relation tree such that the nuclear family is linked with the associated individual.

2. The method for creating the relation tree of claim 1 further comprising organizing the digital images in clusters in response to at least one of the facial analysis performed on the digital images.

3. The method for creating the relation tree of claim 2 wherein a cluster corresponds to an individual and the cluster includes digital images of the corresponding individual.

4. The method for creating the relation tree of claim 3 further comprising identifying a gender, an age, and an ethnicity of the corresponding individual in a cluster.

5. The method for creating the relation tree of claim 2 further comprising classifying clusters with a large amount of the digital images as major clusters.

6. The method for creating the relation tree of claim 1 wherein a facial analysis includes at least one from the group consisting of a facial recognition analysis, a demographic analysis, and a facial similarity analysis.

7. The method for creating the relation tree of claim 1 wherein identifying the nuclear family includes identifying parents and children of the nuclear family.

8. The method for creating the relation tree of claim 7 wherein the parents of the nuclear family include individuals identified to be oldest members of the nuclear family which frequently appear to be positioned next to one another in the digital images.

9. The method for creating the relation tree of claim 7 wherein the children of the nuclear family include individuals who are identified to be younger than the parents and who frequently appear to be positioned next to the parents in the digital images.

10. A machine comprising:
a processor;
digital images stored on a storage device and configured to be sorted into clusters;
a digital display device configured to render a relation tree; and
a relation application executed by the processor from computer readable memory to identify members of a nuclear family from the clusters and organize the relation tree such that at least on associated individual from the clusters is linked with the nuclear family in the relation tree.

11. The machine of claim 10 wherein the relation application additionally executes at least one facial analysis on the digital images to identify at least one from the group consisting of a member of the nuclear family, an extended family member, an acquaintance of the nuclear family, and a stranger.

12. The machine of claim 11 wherein an individual is identified to be a member of the nuclear family when the relation application determines at least one from the group consisting of that a major cluster corresponds to the individual, the individual frequently appears next to other individuals with corresponding major clusters, and the individual includes facial features identified to be similar to other individuals with corresponding major clusters.

13. The machine of claim 11 wherein an individual is identified to be an extended family member when the relation application determines that the individual frequently appears with at least one member of the nuclear family and the individual includes facial features identified to be similar to at least one member of the nuclear family.

14. The machine of claim 11 wherein an individual is identified to be an acquaintance of the nuclear family when the individual does not frequently appear with at least two from the group consisting of a member of the nuclear family and an extended family member and the individual does not include facial features identified to be similar to at least one member of the nuclear family.

15. The machine of claim 11 wherein the relation application further identifies relations between at least one extended family member and at least one acquaintance of the nuclear family and proceeds to link extended family members and acquaintances in response to the relations.

16. The machine of claim 10 wherein the relation application additionally identifies which member of the nuclear family an individual is associated with and links the individual to the corresponding member of the nuclear family.

17. A non-transitory computer readable medium comprising instructions that if executed cause a processor to:
organize digital images from a storage device in clusters in response to at least one facial analysis on the digital images;
wherein the processor is additionally to identify members of a nuclear family and an association of an individual with the nuclear family in response to at least one of the facial analysis; and
wherein the processor is further to organize a relation tree where the individual is linked to the nuclear family.

18. The non-transitory computer readable medium of claim 17 wherein the relation application additionally ranks the clusters in response to a size of the clusters.

19. The non-transitory computer readable medium of claim 18 wherein the relation application further groups together clusters with corresponding individuals whose age are close to one another.

20. The non-transitory computer readable medium of claim 19 wherein the relation application identifies members of the nuclear family and renders the nuclear family to be linked to other individuals in response to the ranks of the clusters and the age of the corresponding individuals.

* * * * *